United States Patent
Orlov et al.

(10) Patent No.: US 12,297,148 B2
(45) Date of Patent: May 13, 2025

(54) SELF-REPAIRING CEMENT INCLUDING MICROCAPSULE-IN-MICROCAPSULE MATERIAL AND DESIGNED SWELLABLE RUBBER AND METHODS FOR FABRICATING SAME

(71) Applicant: SAUDI ARABIAN OIL COMPANY, Dhahran (SA)

(72) Inventors: Maxim Orlov, Moscow (RU); Abdullah S. Al-Yami, Dhahran (SA); Madina Baltaeva, Astrakhan (RU)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 677 days.

(21) Appl. No.: 17/453,297

(22) Filed: Nov. 2, 2021

(65) Prior Publication Data

US 2023/0136906 A1    May 4, 2023

(51) Int. Cl.
*B01J 13/16* (2006.01)
*C04B 20/00* (2006.01)
(Continued)

(52) U.S. Cl.
CPC ........... *C04B 20/0008* (2013.01); *B01J 13/16* (2013.01); *C04B 20/0036* (2013.01);
(Continued)

(58) Field of Classification Search
CPC ........... C04B 20/0008; C04B 20/0036; C04B 20/1037; C04B 2103/0049;
(Continued)

(56) References Cited

U.S. PATENT DOCUMENTS

| | | |
|---|---|---|
| 5,248,704 A | 9/1993 | Rossio et al. |
| 5,326,484 A | 7/1994 | Nakashima et al. |

(Continued)

FOREIGN PATENT DOCUMENTS

| | | |
|---|---|---|
| CN | 1298420 C | 2/2007 |
| CN | 107970868 A | 5/2018 |

(Continued)

OTHER PUBLICATIONS

Roy, Pratanu et al., "Fabrication and Transport of Double Emulsion Microcapsules for Applications in Unconventional Resources"; Proceedings of the SPE/AAPG/SEG Unvonventional Resources Technology Conference (URTec); Paper No. URTEC-2154212-MS; pp. 1-10; Jul. 20-22, 2015 (10 pages).

(Continued)

*Primary Examiner* — Ruiyun Zhang
(74) *Attorney, Agent, or Firm* — Osha Bergman Watanabe & Burton LLP

(57) ABSTRACT

Microcapsule encapsulated microcapsule (MIM) material compositions and methods for preparing the same are provided for self-repairing cements that include a plurality of first microcapsules where each of the first microcapsule comprises a first core and a first shell and a plurality of second microcapsules that each comprise a second core and a second shell where the plurality of second microcapsules are dispersed within a continuous phase comprised within the first core of each of the first microcapsules. The MIM material may be prepared such that the first and second shell comprise a cross-linked material. Compositions for self-healing cement slurries are also provided and include cement, sand, water, and microcapsule encapsulated microcapsules (MIM) materials.

22 Claims, 2 Drawing Sheets

(51) Int. Cl.
*C04B 20/10* (2006.01)
*C04B 24/12* (2006.01)
*C04B 28/02* (2006.01)
*C04B 28/04* (2006.01)
C04B 103/00 (2006.01)
C04B 103/40 (2006.01)
C04B 111/00 (2006.01)

(52) U.S. Cl.
CPC ........ *C04B 20/1037* (2013.01); *C04B 24/125* (2013.01); *C04B 28/02* (2013.01); *C04B 28/04* (2013.01); *C04B 2103/0049* (2013.01); *C04B 2103/0067* (2013.01); *C04B 2103/40* (2013.01); *C04B 2111/00663* (2013.01)

(58) Field of Classification Search
CPC ........ C04B 2103/0067; C04B 2103/40; C04B 2111/00663; C04B 24/125; C04B 28/02; B01J 13/16
USPC ........................................................ 523/206
See application file for complete search history.

(56) References Cited

U.S. PATENT DOCUMENTS

| | | | |
|---|---|---|---|
| 6,288,133 | B1 | 9/2001 | Hagquist |
| 7,252,842 | B2 | 8/2007 | Albayrak |
| 8,362,113 | B2 | 1/2013 | Xing et al. |
| 8,551,244 | B2 | 10/2013 | Le Roy-Delage et al. |
| 9,486,416 | B2 | 11/2016 | Winchester et al. |
| 9,598,313 | B2 | 3/2017 | Keung et al. |
| 10,125,302 | B2 | 11/2018 | Mishra et al. |
| 10,501,687 | B2 | 12/2019 | Johnson et al. |
| 10,941,329 | B2 | 3/2021 | Droger et al. |
| 2003/0087974 | A1 | 5/2003 | Lekovic et al. |
| 2008/0108524 | A1 | 5/2008 | Willberg et al. |
| 2018/0071695 | A1 | 3/2018 | Weitz et al. |
| 2018/0072624 | A1 | 3/2018 | Dong |
| 2018/0258340 | A1 | 9/2018 | Rothrock et al. |
| 2018/0343855 | A1 | 12/2018 | Fuchs et al. |

FOREIGN PATENT DOCUMENTS

| | | | |
|---|---|---|---|
| CN | 108892407 A | 11/2018 | |
| CN | 209799168 U | 12/2019 | |
| CN | 107961747 B | 2/2020 | |
| CN | 108993331 B | * 3/2020 | ............. B01J 13/02 |
| CN | 107500589 B | 6/2020 | |
| CN | 108046710 B | 8/2020 | |
| CN | 110776270 B | 11/2020 | |
| CN | 111925156 A | 11/2020 | |
| KR | 101168038 B1 | 7/2012 | |
| WO | 2019/066649 A1 | 4/2019 | |
| WO | 2019/191065 A2 | 10/2019 | |

OTHER PUBLICATIONS

Yang, Zhengxian et al., "A self-healing cementitious composite using oil core/silica gel shell microcapsules"; Cement & Concrete Composites; vol. 33, Issue 4; pp. 506-512; Feb. 4, 2011 (7 pages).

White, S. R. et al., "Autonomic healing of polymer composites"; Nature; vol. 409; pp. 794-797; Feb. 15, 2001 (5 pages).

* cited by examiner

SELF-REPAIRING CEMENT INCLUDING MICROCAPSULE-IN-MICROCAPSULE MATERIAL AND DESIGNED SWELLABLE RUBBER AND METHODS FOR FABRICATING SAME

BACKGROUND

During the drilling of oil and gas wells, primary cementing is the process of placing cement slurry in the annulus between the steel casing and the geological formation. After hardening, this hollow cylinder is called cement-sheath. A purpose of the well cement is to serve as a primary barrier, completely isolating oil, gas and water from the wellbore. It also keeps the casing in place, prevents corrosion and provides zonal isolation, which are key to safe production of hydrocarbons and preventing contamination.

In order to explore oil and gas reservoirs in ultra-deep drilling, harsh environment conditions must be overcome. These extreme service conditions may result in crushing or cracking of the well cement. For example, in certain conditions high internal pressure may expand the casing and the cement sheath, which causes tensile stress on the cement sheath. Generally, cement materials can be brittle, and the compressive strength is greater than the tensile strength of cement formations. As a result, the increased tensile stress on the cement sheath from the internal pressure may further result in damage, such as cracking or fracture, to the cement sheath, which can then lead to undesired leaking.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to compositions of microcapsule encapsulated microcapsule (MIM) materials for self-repairing cement. The MIM material may include a plurality of first microcapsules where each of the first microcapsule comprises a first core and a first shell and a plurality of second microcapsules that each comprise a second core and a second shell where the plurality of second microcapsules are dispersed within a continuous phase comprised within the first core of each of the first microcapsules. The MIM material may be prepared such that the first and second shell comprise of cross-linked material.

In another aspect, embodiments disclosed here relate to methods for forming a microcapsule encapsulated microcapsule (MIM) material for self-repairing cement. The methods may include first forming a water-in-oil emulsion containing an aqueous phase dispersed within a hydrophobic media continuous phase, where the aqueous dispersed phase comprises a mixture of polyol compounds and where the continuous phase is comprised of a solvent. Next, methods may include adding a mixture of a prepolymer and a dissolved or liquid isocyanate compound to the water-in-oil emulsion and polymerizing the prepolymer in a first stage polymerization reaction with the polyol via interfacial polymerization to form a polymeric microcapsule shell to encapsulate the liquid polyol compound in the formed polymeric microcapsule and thereby produce a plurality of second microcapsules. Next, methods may include forming a second water-in-oil-in-water emulsion, where the continuous phase may include an aqueous solution and the dispersed phase is comprised of the water-in-oil emulsion comprising the produced plurality of second microcapsules. Methods may then include adding a second quantity of the prepolymer and the liquid isocyanate compound to an aqueous solution containing a surfactant and adding a cross-linker to polymerize the prepolymer in a second stage polymerization reaction with the cross-linker via interfacial polymerization to form a larger polymeric microcapsule shell to encapsulate the liquid isocyanate compound and the plurality of second microcapsules in the formed polymeric microcapsule and produce a plurality of first microcapsules.

In a further aspect, embodiments disclosed herein relate to a self-healing cement slurry including: cement; sand; water; and microcapsule encapsulated microcapsules (MIM) material. The MIM material may include a plurality of first microcapsules comprising a first core and a first shell and a plurality of second microcapsules that each comprise a second core and a second shell, where the plurality of second microcapsules are dispersed in a continuous phase within each of the first cores of the first microcapsule. The MIM material may be further be prepared such that the first and second shell are comprised of a polyurethane cross-linked material. The self-healing cement slurry may include the MIM material in an amount ranging from 1 to 50% by weight, relative to the entire weight of the cement slurry.

Other aspects and advantages of the claimed subject matter will be apparent from the following description and the appended claims.

DETAILED DESCRIPTION

Figure 1:
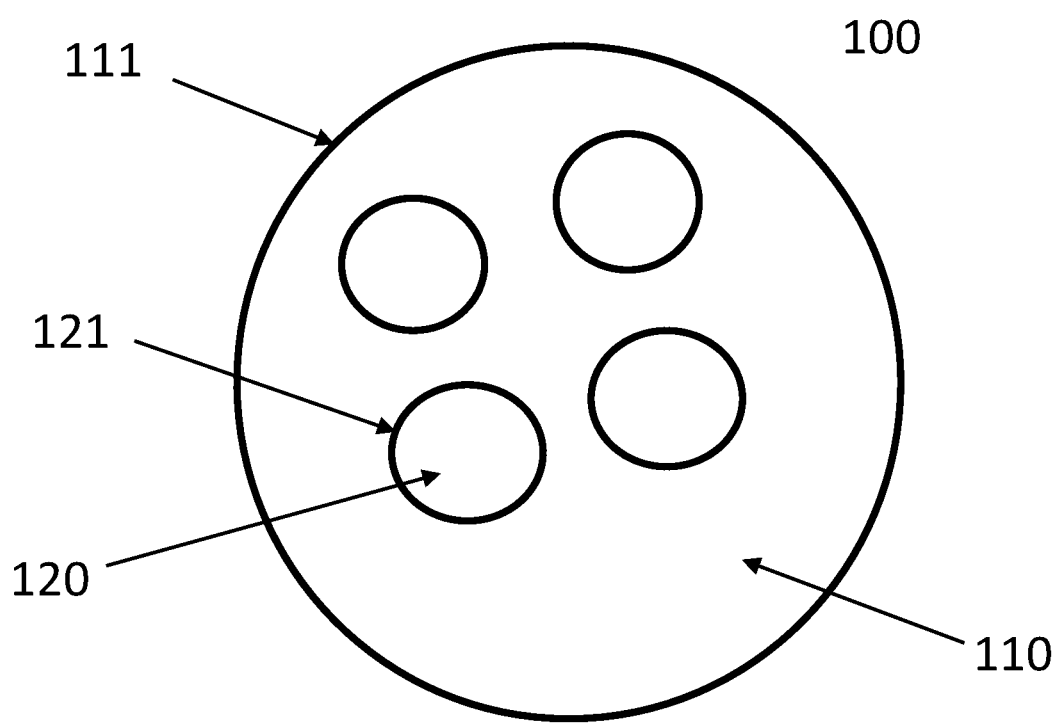
FIG. 1 is a representation of a microcapsule-in-microcapsule material prepared in accordance with one or more embodiments of the present disclosure.
Figure 2:
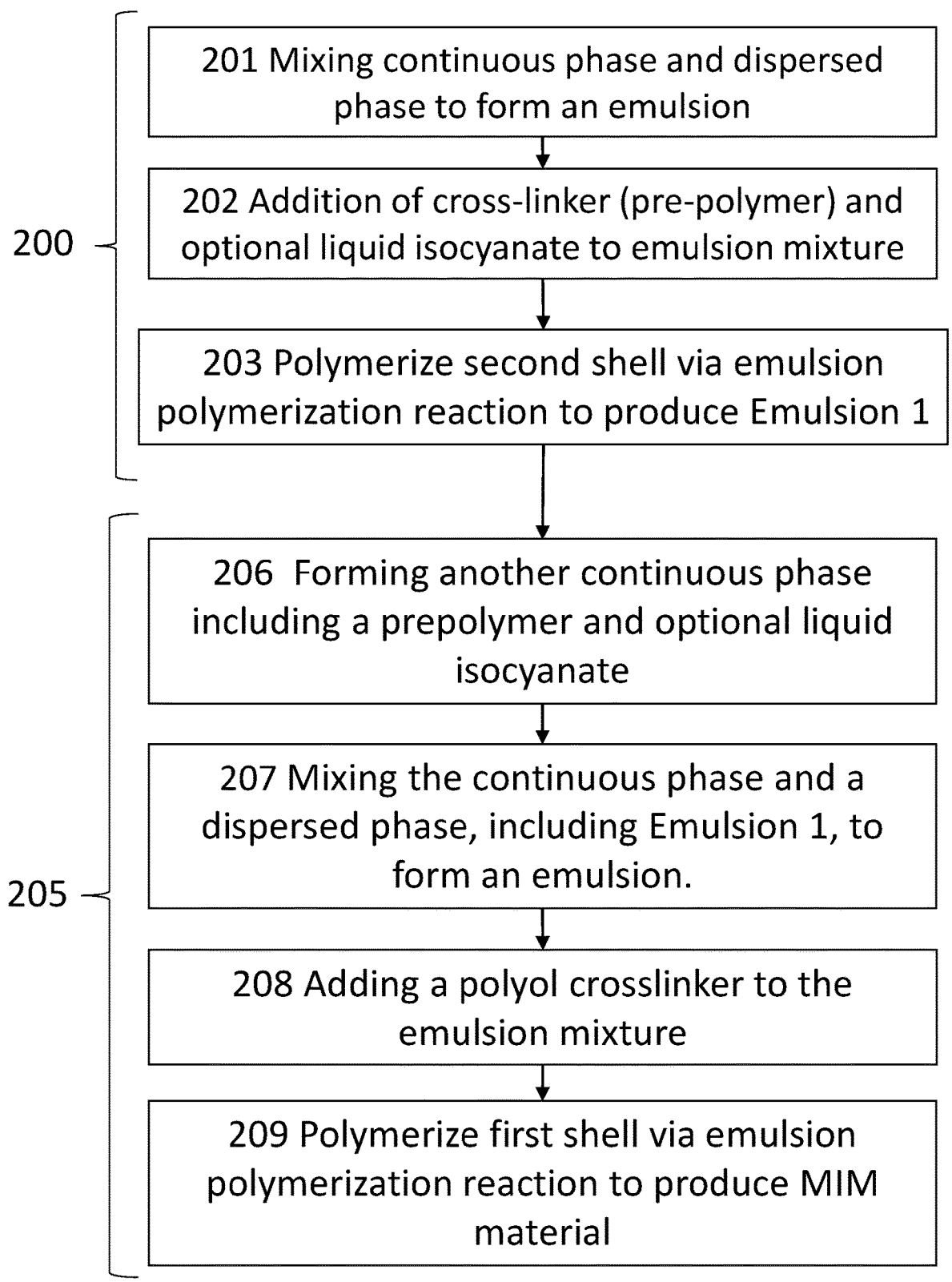
FIG. 2 is a schematic representation of a two stage synthesis for producing a microcapsule-in-microcapsule material.

Embodiments of the present disclosure are directed to a composition of a microcapsule-in-microcapsule (MIM) material, and methods for fabricating the same, that can be formulated into a concrete and/or cement. In one or more embodiments, the MIM material may be capable of producing a polyurethane-based foam that can occupy larger volumes than the MIM material by itself when the cement cracks and breaks the MIM material. In one or more embodiments, the MIM material may be prepared via a combination of double emulsion and interfacial polymerization.

One or more embodiments of the present disclosure may also relate to a swellable micronized rubber and a preparation method thereof. The micronized rubber may be prepared in two forms where the first form is a water-swellable material with hydrophilic functional groups and the second form is an oil-swellable material prepared with oleophilic functional groups. These forms may be added to the cement mixture either individually or together to produce a self-repairing effect based on the liquid present in the environment around the newly formed crack. In one or more embodiments, the swellable micronized rubber may be added alone or in combination with the microcapsule-in-microcapsule material of one or more embodiments of the present disclosure.

This description is given to illustrate and to detail the concepts given in the summary. However, different embodiments are possible, thus the description should not limit possible embodiments. The following description outlines key concepts and features of the invention, which will be further elaborated in the detailed description section.

In one or more embodiments, methods may include introducing the MIM material to a cement formulation to provide the cement with a self-repairing effect by mechanical rupture of the material and release of the active material followed by a chemical reaction between isocyanates and polyols in the presence of water to create a foam material that fills the cracks and repairs them.

Embodiments of the present disclosure also relate to a method for the release of the encapsulated materials from one MIM material that, in the presence of water, can react to produce a polyurethane foam. The produced foam may have cement like mechanical properties and occupy a volume larger than the initial materials encompassed in the MIM material. When added to the cement, these microcapsules can impart an ability to self-repair the cracks with the foam formed in the process of microcapsule wall rupture followed by chemical reaction.

Microcapsule-In-Microcapsule Material

Embodiments of the present disclosure are directed to a MIM material 100 comprised of a plurality of first microcapsules where each of the first microcapsules comprises a plurality of second microcapsules. Each of the first microcapsules may include a first core 110 and a first wall 111 where the first wall 111 is made of polymerized polyurethane cross-linked material and the first core 110 includes a hydrophobic media with dissolved isocyanates, one or more surfactants, and the plurality of second microcapsules of a smaller size. The smaller size microcapsules may further comprise a second core 120 and a second wall 121 where the second wall 121 is comprised of a polyurethane cross-linked material and the second core 120 contains a water-based media that includes dissolved polyols and surfactant molecules.

The MIM material's diameter is influenced by a combination of several factors, including the geometry of the mixing device, viscosity of reaction media, surfactant concentration, agitation rate, temperature, etc. The formed MIM materials comprised of a plurality of first microcapsules are formed such that each of the first microcapsules may be characterized as having an average diameter in the range 10-500 µm. In one or more embodiments, the formed first microcapsules may have an average diameter that ranges from a lower limit of 10, 25, 50 75, 100, 150, 200, 250, and 300 to an upper limit of 100, 150, 200, 250, 300, 350, 400, 450, and 500 µm, where any lower limit may be combined with any mathematically feasible upper limit.

The resulting diameter of the formed MIM materials may be controlled during manufacturing by adjusting the agitation of the medium over a range of 300-2000 rpm, for example. The average thickness of the first wall 111 may range from 2 to 30 µm. The formed MIM materials may have a spherical shape with no tendency to aggregate.

The formed MIM material may have a low first wall thickness to total diameter ratio (FWT/TD) which ranges from 1/250 to 3/1. In one or more embodiments, the formed MIM material may have a FWT/TD ratio which ranges from a lower limit of about 1/250, 1/200, 1/150, 1/100, 1/75, 1/50, 1/25, 1/20, 1/15, 1/10, 1/5, and 1/1 to an upper limit of 1/100, 1/75, 1/50, 1/25, 1/20, 1/15, 1/10, 1/5, 1/1, 2/1, and 3/1, where any lower limit may be combined with any mathematically feasible upper limit.

It should be noted that with a decrease in the rate of agitation, the mean size of microcapsules increases and resulting shell thickness decreases. As a result, the mechanical force required to trigger or rupture the microcapsules increases in corresponding fashion. Thus, the conditions of the MIM synthesis can be selectively tailored for preparing material with the necessary micromechanical properties. Additionally, the selected diameter and shell thickness of the MIM will depend on the width of cracks and the amount of rupture force that can happen in the cement mortar and will be enough to trigger all MIM.

In one or more embodiments, MIM composition may include a polyisocyanate and a polyol, as described herein, where equivalents of liquid or dissolved polyisocyanates and polyols may be contained within their respective first and second microcapsule cores in a ratio, relative to each other, of from 0.9:1 to 1:1.1. In some embodiments, upon rupture of the MIM material shells, an excess of isocyanate may be reacted with a polyol in the presence of water to form a polyurethane foam.

Preparation of Microcapsule-In-Microcapsule Material

In one or more embodiments, MIM materials may be prepared via a combination of emulsion polymerization and interfacial polymerization, and cross-linking, where two reactants, in the form of an emulsion, meet at an interface and react rapidly. The reaction and subsequent polymerization may produce a polymerized and cross-linked barrier or wall that can form rapidly at the interface of the emulsion. This polymerization and wall formation may form instantaneously at the interface of the emulsion droplets. The method as detailed herein is versatile and provides for selectively tailoring the properties of the formed first and second microcapsules, including size, porosity, degradability, and mechanical resistance.

The low shell thickness/diameter ratio of first microcapsules offers an ideal storage capacity for the healing agents, which is believed to be a desired feature for self-healing application in cementitious materials.

To increase the healing efficiency and prolong the working life of the MIM material, the MIM materials may have a different trigger sensitivity based on crack width. To achieve the multi-scale trigger function of cementitious material, MIM materials comprised of the first microcapsules with different diameters may be used. For example, a particle diameter size distribution of the first microcapsules of the MIM materials may be characterized in three distinct groups including small, medium, and large, or a combination thereof, where the range of diameters for each group may be from 10 to 150 µm, from 150 to 300 µm, and from 300 to 500 µm, respectively.

The target range in the first microcapsule diameter size distribution may depend on the intended use of the cement, and while cracks are not desired or expected under normal load conditions, laboratory experiments may be used to evaluate expected crack width and propagation of a cement that may occur during use, so as to optimize the effective MIM particle size distribution.

Accordingly, one or more embodiments of the present disclosure may relate to methods for forming MIM materials. The methods of one or more embodiments may include a series of steps where a first water-in-oil emulsion is formed to produce a second plurality of microcapsules, followed by a second stage where an oil-in-water emulsion is formed to produce the plurality of first microcapsules that comprises the plurality of second microcapsules.

First-Stage Emulsion Polymerization Reaction

In one or more embodiments, methods for preparing MIM materials and encapsulating active materials may include a first stage 200 of forming a plurality of smaller second microcapsules, for subsequent encapsulation. A first step in the preparation of the plurality of second microcapsules includes mixing a hydrophobic media-based continuous solvent and a surfactant to produce a continuous phase. Following the preparation of the continuous phase, a water-based dispersed phase may be prepared by mixing a dispersed solvent and a dispersed polymer. In one or more embodiments, the dispersed solvent and the continuous solvent may be immiscible. Next, the continuous phase and the dispersed phase are mixed 201 to form an emulsion where the dispersed phase is dispersed as droplets in the continuous phase.

Emulsions of one or more embodiments of the present disclosure may be defined by an interface that forms droplets of the dispersed phase dispersed in the continuous phase. One or more embodiments then include a step 202 of adding a crosslinker to the mixture followed by a step 203 of allowing the dispersed polymer to react with the cross-linker and form a cross-linked polyurethane interface to effectively form a wall or "shell" at the interface of the emulsion. The resulting product is referred to as "Emulsion 1." The cross-linker may be added alone, or in combination with one or more additional liquid isocyanate compounds as described in one or more of the embodiments herein.

In one or more embodiments, in the first stage 200 emulsion polymerization reaction, the dispersed solvent may include a water-based media such as water, ethanol, methanol, or a combination thereof.

In the first stage 200 emulsion polymerization reaction, the dispersed polymer may be a polyol, that is defined as a polymer molecule having, on average, at least two hydroxyl groups per molecule. In one or more embodiments, the dispersed polymer of the first stage emulsion polymerization reaction may be a polyol, as defined in any of the below embodiments. For example, the dispersed polyol polymer may be a polymer diol having two hydroxyl groups in the molecule thereof, or a polymer triol having three hydroxyl groups in the molecule thereof. In one or more embodiments, the dispersed polymer of the first stage emulsion polymerization reaction may be a polycarbonate polyol. Additionally, one or more embodiments may include a polyether polyol or a polyester polyol to be used together with the polycarbonate polyol(s) as the polymer polyol of the first stage emulsion polymerization reaction.

In the first stage 200 emulsion polymerization reaction, the continuous solvent may include oil, mineral oil, cyclohexane, chloroform, hexane, toluene, chlorobenzene, cyclohexanone, or a combination thereof, as described in one or more embodiments above.

In one or more embodiments, the liquid isocyanate may be a monomeric diisocyanate compound. In one or more embodiments, encapsulated isocyanate compounds may include, but are not limited to, monomeric methylene diphenyl diisocyanate (MDI), hexamethylene diisocyanate (HDI), isophorone diisocyanate (IPDI), toluene diisocyanate (TDI) (any of the five possible isomers thereof, for example, 2,4-TDI toluene diisocyanate or 2,6-toluene diisocyanate), 1,5-naphthalene diisocyanate (NDI), 1,4-phenylene diisocyanate (PDI), hexahydrotoluylene diisocyanate (H6TDI), hydrogenate MDI, trimethyl hexamethylene diisocyanate, tetramethyl xylylene isocyanate, tetramethyl xylylene diisocyanate, xylylene diisocyanate, or combinations thereof. In accordance with the above, in some embodiments the isocyanate may be an unblocked compound/monomer, such as, unmodified methane diphenyl diisocyanate (UMDI), hexamethylene diisocyanate (HDI), isophorone diisocyanate (IPDI), or toluene diisocyanate (TDI).

In one or more embodiments, the first stage 200 emulsion polymerization reaction crosslinker, also referred to as "prepolymer," may be a polyisocyanate having, on average, at least two isocyanate groups per molecule. The polyisocyanate may be characterized as having isocyanate groups that are bonded to aromatic or aliphatic carbon atoms. In one or more embodiments, the cross-linker may be methylene diphenyl diisocyanate (MDI) prepolymer and may be used for the preparation of polymeric microcapsules as described herein. In some embodiments, one or more isomers of MDI, such as, 2,2'-MDI, 2,4'-MDI, and 4,4'-MDI may be used for the preparation of polymeric microcapsules as described herein. In one or more embodiments, aromatic isocyanates may be employed and may be one or more of 2,4-toluene diisocyanate or 2,6-toluene diisocyanate (TDI), p-phenylene diisocyanate, polymethylene polyphenyl polyisocyanate or mixtures thereof.

In one or more embodiments, there may be a large difference in reactivities of cross-linker polyisocyanate and liquid isocyanate which can lead to stable first wall 111 formation and capsules with a high polyol fill content. The quantity of prepolymer should be enough for the first wall 111 formation and may vary depending upon the polyols' concentration.

Suitable prepolymers of MDI may be commercially available and can include, but are not limited to, MDI prepolymers of Huntsman Corporation under the name Suprasec such as Suprasec® 2644, MDI prepolymers of Bayer Material Science under the name Desmodur® such as Desmodur® VP LS 2086, MDI prepolymers of Dow Polyurethanes under the trademark ISONATE®, for example ISONATE® 181, or MDI prepolymers of BASF AG under the trademark Lupranate®, for example Lupranate® 5050. In some embodiments, the prepolymers can be synthesized using monomeric MDI, TDI, and polyol in $N_2$ media. In such embodiments, the molar ratio of monomeric isocyanate to polyol may range from 3:1 to 6:1. The synthesis reaction may last for 2 to 24 hours at a temperature of 50-80° C. (122-176° F.).

In one or more embodiments, the prepolymer of MDI or TDI may be of any molecular weight, as long as the prepolymer contains a sufficient number of isocyanate groups (NCO content) and where the isocyanate groups may have a sufficient reactivity (reactivity of NCO) to react with a polyol, as discussed herein, to form a polyurethane capsule (shell) in which a chosen liquid isocyanate compound may be encapsulated by interfacial polymerization.

In one or more embodiments, the first stage 200 emulsion polymerization reaction includes additions of a prepolymer cross-linker and a polyol, where equivalents of polyols and prepolymer crosslinker may be added in an amount, such that each are present in solution at a ratio (polyol to prepolymer) ranging from 70:30 to 90:10. This ratio can dictate the shell thickness and also the effectiveness of encapsulation process. In addition, there must be an excess of polyol to isocyanate in order to form capsules and allow for excess polyol to remain in the core of the plurality of second microcapsules.

As described above, the first stage 200 emulsion polymerization reaction may include adding the cross-linker and a liquid isocyanate to the emulsion including the dispersed and continuous phase to initiate the polymerization and formation of a capsule shell.

Second-Stage Emulsion Polymerization Reaction

In one or more embodiments, Emulsion 1 may be further encapsulated via a second stage 205 emulsion polymerization reaction.

In one or more embodiments, methods for preparing MIM materials and encapsulating active materials may include a second stage 205 of encapsulating the formed plurality of second microcapsules produced in the emulsion polymerization reaction of stage one 200. In one or more embodiments, a method for encapsulating Emulsion 1 and the enclosed active material includes a step of forming a continuous phase 206 via mixing a continuous solvent and a surfactant to produce a continuous phase. Similar to stage one 200, the second stage 205 emulsion polymerization reaction includes a dispersed phase wherein the emulsion produced from the first emulsion polymerization reaction serves as the dispersed phase in the second stage emulsion polymerization reaction. The dispersed phase and the continuous solvent are immiscible.

The second stage emulsion polymerization reaction 205 includes a step 207 of mixing the continuous phase and the dispersed phase to form an emulsion such that the dispersed phase is dispersed as droplets in the continuous phase. An interface defines the droplets of the dispersed phase in the continuous phase.

In one or more embodiments, in the second stage 205 emulsion polymerization reaction, the continuous phase solvent may include water, ethanol, methanol, or a combination thereof. In one or more embodiments, a prepolymer, as defined above, and a liquid isocyanate compound, may be added to the aqueous solution that contains a surfactant. The liquid isocyanate may be added in an amount such that it is present in molar excess, relative to polyol contained in the microcapsules formed in the first emulsion polymerization reaction. In the second stage 205 emulsion polymerization reaction, the dispersed component may be Emulsion 1 of the first stage emulsion polymerization reaction 203.

In one or more embodiments, the amount of the liquid isocyanate added in the second stage emulsion polymerization reaction may depend upon the amount of polyol contained in the microcapsules formed in the first stage emulsion polymerization reaction, where equivalents of liquid or dissolved polyisocyanates and polyols may be contained within their respective first and second microcapsule cores in a ratio, relative to each other, ranging from 0.9:1 to 1:1.1.

The method includes a further step 208 of adding a polyol crosslinker to the mixture. In the second stage 205 emulsion polymerization reaction, the polyol cross-linker is added to the oil-in-water emulsion to polymerize 209 the prepolymer with the polyol via interfacial polymerization to form the shell of the outer polymeric microcapsule, thereby encapsulating the liquid isocyanate compound and polyol-containing plurality of second microcapsules within the formed plurality of first polymeric microcapsules.

In the second stage 205 emulsion polymerization reaction, the cross-linker may be a polyol. For example, in one or more embodiments, the dispersed polymer of the first stage emulsion polymerization reaction may be a polyol, as defined in any of the above embodiments. For example, the dispersed polyol polymer may be a polymer diol having two hydroxyl groups in the molecule thereof, or a polymer triol having three hydroxyl groups in the molecule thereof. In one or more embodiments, the dispersed polymer of the first stage 200 emulsion polymerization reaction may be a polycarbonate polyol. Additionally, one or more embodiments may include a polyether polyol or a polyester polyol to be used together with the polycarbonate polyol(s) as the polymer polyol of the first stage emulsion polymerization reaction.

In the second stage 205 emulsion polymerization reaction, the dispersed phase solvent may include oil, mineral oil, cyclohexane, chloroform, hexane, toluene, chlorobenzene, cyclohexanone or a combination thereof, as described in one or more embodiments above.

In one or more embodiments, the second stage 205 emulsion polymerization reaction includes adding a combination of prepolymer and a polyol to form the microcapsule shell, as described above, where equivalents of prepolymers and polyols may be added in an amount, such that the molar ratio of NCO/OH of prepolymer and polyol are present in a ratio ranging from 1/1 to 10/1.

In one or more embodiments, the reaction temperature and time for each of the first stage 200 and second stage 205 emulsion polymerization reactions may depend on the particular polyol and prepolymer isocyanate components used, and their specific activities. In some embodiments, the reaction temperature may be in the range from about 125° F. (51° C.) to about 225° F. (108° C.) in some embodiments, and in the range from about 150° F. to about 200° F. in other embodiments, such as in the range from about 175° F. (80° C.) to about 190° F. (88° C.).

Hydrophobic Media/Solvent

In one or more embodiments, the hydrophobic media of either the first or second stage polymerization reaction include oil, mineral oil, cyclohexane, chloroform, hexane, toluene, chlorobenzene, cyclohexanone or a combination thereof, as described in one or more embodiments above.

In the first stage emulsion polymerization reaction, the amount of the hydrophobic media may be in a ratio ranging from 60 wt % to 90 wt % of the water-in-oil emulsion. In the second stage emulsion polymerization reaction for preparing MIM materials, the amount of the hydrophobic media may be present in a ratio ranging from 10 wt % to 40 wt % of the water-oil-water emulsion.

Water-Based Media

In one or more embodiments, the water-based media of either the first or second stage polymerization reaction may be one or more of water, ethanol, and methanol, or a combination thereof.

In the first stage emulsion polymerization reaction, the amount of the water-based media may be in a ratio ranging from 10 wt % to 40 wt % of the water-in-oil emulsion. In the second stage emulsion polymerization reaction for preparing MIM materials, the amount of the water-based media may be present in a ratio ranging from 60 wt % to 90 wt % of the water-oil-water emulsion.

Liquid Isocyanates

In one or more embodiments, as described above, an isocyanate compound may be encapsulated within the first cross-linked polyurethane microcapsule. The isocyanate compound may be a compound that is liquid under the conditions chosen for the encapsulation process or a compound that may be a solid but can be liquefied in the encapsulation process. For example, a solid isocyanate may be capable of being dissolved in a reaction mixture for use in the encapsulation process.

In one or more embodiments, after encapsulation, the isocyanate compound may be in a liquid state. This provides for MIMs material that may be used for seal-healing applications, in which the isocyanate compound exits from the capsule, once the shell of the capsule is ruptured or damaged, for example, by physical or mechanical interaction or by a chemical process, and then reacts, for example, with moisture from the environment to form a protective polymer.

In one or more embodiments, the encapsulated isocyanate compound may be a monomeric diisocyanate compound. In one or more embodiments, encapsulated isocyanate compounds may include, but are not limited to, monomeric methylene diphenyl diisocyanate (MDI), hexamethylene diisocyanate (HDI), isophorone diisocyanate (IPDI), toluene diisocyanate (TDI) (any of the five possible isomers thereof, for example, 2,4-TDI toluene diisocyanate or 2,6-toluene diisocyanate), 1,5-naphthalene diisocyanate (NDI), 1,4-phenylene diisocyanate (PDI), hexahydrotoluylene diisocyanate (H6TDI), hydrogenate MDI, trimethyl hexamethylene diisocyanate, tetramethyl xylylene isocyanate, tetramethyl xylylene diisocyanate, xylylene diisocyanate, or combinations thereof. In accordance with the above, in some embodiments the isocyanate may be an unblocked compound/monomer, such as, unmodified methane diphenyl diisocyanate (UMDI), hexamethylene diisocyanate (HDI), isophorone diisocyanate (IPDI), or toluene diisocyanate (TDI).

In one or more embodiments, the weight percent of the liquid isocyanate component in the hydrophobic media may be in a range from 50 wt % to 95 wt %. Specifically, in one or more embodiments the weight percent of the liquid isocyanate component in the hydrophobic media may range from a lower limit of 50, 55, 60, 65, 70, 75, and 80 wt % to an upper limit of 65, 70, 75, 80, 85, 90 and 95 wt %, where any lower limit may be combined with any mathematically feasible upper limit.

Prepolymers

In one or more embodiments, as described before, the first stage 200 emulsion polymerization reaction crosslinker, also referred to as "prepolymer," may be a polyisocyanate having, on average, at least two isocyanate groups per molecule. The polyisocyanate may be characterized as having isocyanate groups that are bonded to aromatic or aliphatic carbon atoms. In one or more embodiments, the prepolymer crosslinker may be methylene diphenyl diisocyanate (MDI) prepolymer and may be used for the preparation of polymeric microcapsules as described in the present disclosure. In some embodiments, one or more isomers of MDI, such as, 2,2'-MDI, 2,4'-MDI, and 4,4'-MDI may be used for the preparation of polymeric microcapsules as described herein. In one or more embodiments, aromatic isocyanates may be employed and may be one or more of 2,4-toluene diisocyanate or 2,6-toluene diisocyanate (TDI), p-phenylene diisocyanate, polymethylene polyphenyl polyisocyanate or mixtures thereof.

As noted above, suitable prepolymers of MDI may be commercially available and can include, but are not limited to, MDI prepolymers of Huntsman Corporation under the name Suprasec such as Suprasec® 2644, MDI prepolymers of Bayer Material Science under the name Desmodur® such as Desmodur® VP LS 2086, MDI prepolymers of Dow Polyurethanes under the trademark ISONATE®, for example ISONATE® 181, or MDI prepolymers of BASF AG under the trademark Lupranate®, for example Lupranate® 5050.

In one or more embodiments, the prepolymer of MDI or TDI may be of any molecular weight, as long as the prepolymer contains a sufficient number of isocyanate groups (NCO content) and where the isocyanate groups may have a sufficient reactivity (reactivity of NCO) to react with a polyol, as discussed herein, to form a polyurethane capsule (shell) in which a chosen liquid isocyanate compound may be encapsulated by interfacial polymerization.

Polyol

In one or more embodiments, MIM material compositions may include a polyol that is capable of both reacting with a prepolymer to form a polyurethane polymer shell, and capable of reacting with isocyanates after rupture of the MIM material to form a polyurethane foam. The encapsulated polyol contained within the plurality of second microcapsules may be a diol, or a triol, and also may be a polyol having four, five or six reactive hydroxyl groups available for the reaction with the isocyanate groups of the prepolymer.

In some embodiments, the microcapsule encapsulated microcapsule compositions may be prepared with one or more diols including, but not limited to, 1,4-butanediol, ethylene glycol, diethylene glycol, triethylene glycol, tetraethylene glycol, propylene glycol, tripropylene glycol, 1,3-propanediol, 1,3-butanediol, neopentyl glycol, 1,6-hexanediol, 2-ethyl-1,3-hexanediol, 1,4-cyclohexanedimethanol and combinations of these diols.

In one or more embodiments, the MIM material compositions may be prepared with one or more triols including, but not limited to glycerol, trimethylolpropane, 1,2,6-hexanetriol, triethanolamine, or combinations thereof.

In one or more embodiments, the MIM material compositions may be prepared with water-soluble polyols that have four, five or six hydroxyl groups, where the water-soluble polyols may be one or more of pentaerythritol, xylitol, and mannitol.

In one or more embodiments, polyols, such as polyvinyl alcohol, may have even more reactive hydroxyl groups and may also be used for the synthesis of the microcapsules of the present disclosure. Such diol, triols and other polyols can be used individually or as a mixture in any possible combination. For example, in one or more embodiments, a mixture of a diol and a triol, a mixture of a diol with a polyol having four, five or six reactive hydroxyl groups, or a mixture of a diol, a triol and a polyol with four reactive hydroxyl groups may be used. Additionally, in embodiments where a polyvinyl alcohol is used, this polyol can simultaneously also act as surfactant and a polyol in methods of encapsulating a liquid isocyanate compound.

In one or more embodiments, the weight percent of the polyol component in the water-based media may be in a range from 50 wt % to 95 wt %. Specifically, in one or more embodiments the weight percent of the polyol component in the water-based media may range from a lower limit of 50, 55, 60, 65, 70, 75, and 80 wt % to an upper limit of 65, 70, 75, 80, 85, 90 and 95 wt %, where any lower limit may be combined with any mathematically feasible upper limit.

Surfactant

In one or more embodiments, the MIM material compositions may be prepared with one or more surfactants including gum arabic, polyvinyl alcohol, gellan gum, mesquite seed gum, gelatin, Tween® 20, Tween® 80, Span® 20, Span® 60, Span® 80 and/or mixtures thereof.

In one or more embodiments, the surfactant is typically present in a concentration up to the critical micelle concentration (CMC). Generally, the presence of the specific quantity of surfactant provides stability to the emulsion and prevents agglomeration of MIM materials during the process.

In the first stage emulsion polymerization reaction of one or more embodiments, the weight percent of an oil-soluble surfactant in the hydrophobic media may range from 0.1 wt % to 10 wt %. For example, in the first stage emulsion polymerization reaction, the amount of oil-soluble surfactant in the hydrophobic media may range from a lower limit of 0.1, 0.5, 1.0, 1.5, 2.0, 2.5, 3.0, 3.5, 4.0, 4.5, and 5.0 wt % to an upper limit of 1, 2, 3, 4, 5, 6, 7, 8, 9, and 10 wt %, where any lower limit may be combined with any mathematically feasible upper limit.

In the second stage emulsion polymerization reaction, the weight percent of a water-soluble surfactant in the water-based media may range from 0.1 wt % to 10 wt %. For example, in the first stage emulsion polymerization reaction, the amount of water-soluble surfactant in the water-based media may range from a lower limit of 0.1, 0.5, 1.0, 1.5, 2.0, 2.5, 3.0, 3.5, 4.0, 4.5, and 5.0 wt % to an upper limit of 1, 2, 3, 4, 5, 6, 7, 8, 9, and 10 wt %, where any lower limit may be combined with any mathematically feasible upper limit.

Swellable Micronized Rubber

One or more embodiments of the present disclosure also provides for an additive swellable material that is capable of absorbing either oil or water based fluids, and expanding in size, relative to its original volume, to fill cracks in a cement body. The swelling additive material may be added to a cement slurry in various amounts depending on the properties of the wellbore and the composition and properties of the cement material.

The micronized rubber may be prepared in two forms. A first form may include a water-swellable material with hydrophilic functional groups. According to one or more embodiments, the water-swellable micronized rubber additive may be prepared from compounds selected from the group consisting of isobutylene maleic anhydride, acrylic acid-type polymers, polyethylene oxide polymers, bentonite, and mixtures thereof.

A second form may include an oil-swellable material with oleophilic functional groups. According to one or more embodiments, the oil-swellable micronized rubber component of the swelling additive may be, but are not limited to, nitrile rubber, styrene butadiene, and fluoro-silicones.

In one or more embodiments the micronized rubbers may be used in any combination and in various amounts. It should also be understood that various mixtures of the presently described micronized rubbers may be added to a cement mixture depending on the conditions, such as temperature and pressure in the wellbore. Embodiments of the swelling additive presently described may include any combination of micronized rubber.

In one or more embodiments, the swellable micronized rubber additive may comprise a mixture of carbon black, zinc oxide, and an elastomer. In particular, the carbon black may be included in an amount ranging from 10.0 wt. % to 40.0 wt. % relative to the total weight of the at least one micronized rubber. The zinc oxide may be included in an amount that is less than 3.0 wt. % of the at least one micronized rubber, and the elastomer may be included in an amount ranging from 60.0 wt. % to 70.0 wt. % of the at least one micronized rubber. In yet another embodiment, the at least one micronized rubber that comprises a mixture of acrylonitrile rubber, zinc oxide, and styrene butadiene copolymer. In particular, the acrylonitrile rubber comprises from 25 wt. % to 50% wt % of the at least one micronized rubber, the zinc oxide comprises less than 2.5% of the micronized rubber, and the styrene butadiene copolymer comprises from 50.0 wt. % to 70.0 wt. % of the micronized rubber.

Cement Composition

In one or more embodiments, when cracks in cement are present, aggressive substances can penetrate much faster in the cement and cause corrosion of casing. Accordingly, the MIM material of one or more embodiments of the present disclosure can heal formed cracks and form a coating on a casing to prevent its corrosion after crack filling.

In one or more embodiments, the cement compositions of the present disclosure comprise a cement. Any of a variety of cements suitable for use in subterranean cementing operations may be used in accordance with embodiments of the present disclosure. In one or more embodiments, the MIM material described herein, and/or one or more swellable micronized rubber additives may be added to a cement slurry composition. In one or more embodiments, the MIM material may be mixed within the cement slurry composition and/or the MIM material may be added as a coating layer to a cement composition.

In one or more embodiments, the cement slurry may include water, a cement precursor material, the presently described MIM material, and/or optionally the micronized rubber swelling additive. The cement precursor material may be any suitable material which, when mixed with water, can be cured into a cement. The cement precursor material may be hydraulic or non-hydraulic. A hydraulic cement precursor material refers to a mixture of limestone, clay and gypsum burned together under extreme temperatures that may begin to harden instantly or within a few minutes while in contact with water. A non-hydraulic cement precursor material refers to a mixture of lime, gypsum, plasters and oxychloride. In one or more embodiments, the cement precursor material may be Portland cement precursor.

The cement precursor material may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO \cdot Al_2O_3 \cdot Fe_2O_3$), gypsum ($CaSO_4 \cdot 2H_2O$) sodium oxide, potassium oxide, limestone, lime (calcium oxide), hexavalent chromium, calcium aluminate, other similar compounds, and combinations of these. The cement precursor material may include Portland cement, siliceous fly ash, calcareous fly ash, slag cement, silica fume, any known cement precursor material or combinations of any of these. In one or more embodiments, the cement precursor comprises silica sand.

In some embodiments, the cement slurry may contain from 1% to 90% of the cement precursor material based on the total weight of the cement slurry. In one or more embodiments, the cement slurry may contain from 1 wt. % to 80 wt. %, from 10 wt. % to 70 wt. %, or from 20 wt. % to 60 wt. % of the cement precursor material based on the total weight of the cement slurry. The cement slurry may contain from 55 wt. % to 90 wt. %, from 60 wt. % to 90 wt. %, from 70 wt. % to 90 wt. %, or from 75 wt. % to 90 wt. % of the cement precursor material based on the total weight of the cement slurry.

The MIM material may be present in an amount that is capable of providing the desired effect of filling cracks in the cement with produced polyurethane foam formed by mechanical rupture of the shell of the MIM material. In one or more embodiments, the cement composition may comprise the MIM material in an amount of in between about 1 to about 50 wt. %. In one or more embodiments, the cement composition may comprise the MIM material in an amount ranging from 1, 2, 5, 8, 10, 12, 15 and 20 wt. % to 8, 10, 12, 15, 20, 25 and 30 wt. % of the total weight of the cement slurry composition, where any lower limit may be combined with any mathematically feasible upper limit.

In one or more embodiments, the cement slurry may optionally also contain from 1 wt. % to 40 wt. % of the swellable micronized rubber additive material based on the total weight of the cement slurry. For instance, the cement slurry may contain from 5 wt. % to 40 wt. %, from 10 wt. % to 30 wt. %, or from 10 wt. % to 20 wt. %. The cement slurry may contain from 15 wt. % to 40 wt. %, from 20 wt. % to 40 wt. %, from 30 wt. % to 40 wt. %, or from 35 wt. % to 40 wt. % of the swellable micronized rubber additive material.

Water may be added to the cement precursor material to produce the slurry. The water may be distilled water, deionized water, tap water, brackish water, formation water, produced water, raw seawater, or filtered seawater. In one or more embodiments, the water may contain additives or contaminants. For instance, the water may include freshwater or seawater, natural or synthetic brine, or salt water. In some embodiments, salt or other organic compounds may be incorporated into the water to control certain properties of the water, and thus the cement slurry, such as density. Added salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these.

In one or more embodiments, the cement slurry may contain from 5 wt. % to 70 wt. % water based on the total weight of the cement slurry. In some embodiments, the cement slurry may contain from 5 wt. % to 50 wt. %, from about 5 wt. % to 30 wt. %, 5 wt. % to 20 wt. %, from 5 wt. % to 10 wt. %, or from 10 wt. % to 70 wt. %, from 30 wt. % to 70 wt. %, or from 50 wt. % to 70 wt. % of water. The cement slurry may contain from 20 wt. % to 40 wt. %, or from 25 wt. % to 35%, such as 30 wt. % of water based on the total weight of the cement slurry.

In one or more embodiments, a greater concentration of the swellable micronized rubber additive may be added to cement materials that have high density and a lesser concentration of the swelling additive may be added to cement materials that have a lesser density. The presently disclosed swellable micronized rubber additive may be added to the cement material as a dry ingredient to the dry cement mixture, or the swellable micronized rubber additive may be added to the cement slurry.

In one or more embodiments, the MIM material composition may be mixed with the cement slurry in mixing equipment, such as a jet mixer, re-circulating mixer, or a batch mixer, for example, and then pumped via pumping equipment to the wellbore. In one or more embodiments, the mixing equipment and the pumping equipment may be comprised in one or more cement trucks as will be apparent to those of ordinary skill in the art. In some embodiments, a jet mixer may be used, for example, to continuously mix the lime/settable material with the water as it is being pumped to the wellbore.

In one or more embodiments, the cement slurry may be introduced into the wellbore, where the cement slurry may form cement through curing. In one or more embodiments provided herein, "curing" may refer to providing adequate moisture, temperature and time to allow the cement to achieve the desired properties (such as hardness) for its intended use through one or more reactions between the water and the cement precursor material. Curing may be a step where no physical action is needed. In contrast, "drying" refers to merely allowing the concrete to achieve a moisture condition appropriate for its intended use, which may only involve physical state changes, as opposed to chemical reactions.

In one or more embodiments, curing the cement slurry may refer to allowing time to pass under suitable conditions upon which the cement slurry may harden or cure through allowing one or more reactions between the water and the cement precursor material. Conditions may be any time, temperature, pressure, humidity, and other appropriate conditions known in the cement industry to cure a cement composition. In some embodiments, suitable curing conditions may be ambient conditions. Curing may also involve hardening or curing the cement slurry by introducing a curing agent to the cement slurry, providing heat or air to the cement slurry, manipulating the environmental conditions of the cement slurry to promote reactions between the water and the cement precursor, a combination of thereof, or any other such means.

In one or more embodiments, the MIM material and/or the optional swellable micronized rubber additive may be comprised in the cured cement body such that when the cement cracks, a self-repairing effect is initiated by mechanical rupture of the MIM material. The mechanical rupture of the MIM material walls may release the active components which then react via chemical reactions between comprised liquid isocyanate and polyols, in the presence of water, to form a polyurethane foam that fills the cracks and repairs them. The compressive strength of samples cured in the presence of moisture result in formed samples with higher compressive strength ranges than conventional cement compositions prepared without MIM material.

EXAMPLES

The following examples are merely illustrative and should not be interpreted as limiting the scope of the present disclosure.

To demonstrate the preparation and composition of the MIM material, according to one or more embodiments disclosed, the following Examples are provided. Additionally, to demonstrate the advantages of the MIM material composition, Examples are provided where tests were conducted to examine the effects of the MIM material in cement samples.

Example Composition and Preparation of MIM Material

In the first stage, in this context, the microencapsulation is illustrated in more detail using, as an example, the interfacial polymerization between TDI-prepolymer as a cross-linker in the chlorobenzene with liquid HDI and 1,4-butanediol as a core. In this Example, the second core of the second microcapsules includes 90% by weight aqueous solution of 1,4 butanediol where the second shell is prepared by interfacial polymerization between TDI-prepolymer and 1,4 butanediol.

In line with the above, a solution of 2% wt sorbitan stearate (Span-60) in chlorobenzene with HDI was prepared as a continuous phase at room temperature. The target core material, 1,4-butanediol, is mixed well with aqueous media (water) to act as the dispersed phase, which is then added into the above liquid isocyanate solution with surfactant under mechanical agitation (3200 rpm) to produce a water-in-oil emulsion. After stabilization, the emulsion system is heated to a set temperature of 158° F. (70° C.), and then a TDI-prepolymer is added to initiate the polymerization reaction between the hydroxyl functional group from the aqueous phase and isocyanate functional group from the oil phase at the water/oil interface. Because the TDI-prepolymer is much more reactive than HDI, 1,4-butanediol reacts with the TDI-prepolymer to form the shell structure, while the less reactive HDI forms the future core of the first microcapsules with second microcapsules (Emulsion 1).

In the second stage, the first core of first microcapsules is 80% by weight of HDI in chlorobenzene with second microcapsules where the first shell is formed by interfacial polymerization between a TDI-prepolymer and 1,4 butanediol.

The second stage microencapsulation is illustrated in more detail using, as an example, the interfacial polymerization between 1,4-butanediol as a cross-linker and TDI-prepolymer in the dispersed phase. In line with the above, a 10% by weight gum arabic aqueous solution is prepared as surfactant solution at room temperature. The target core material, Emulsion 1, is mixed well with TDI-prepolymer to act as the dispersed phase, which is then slowly added to the gum arabic aqueous solution under mechanical agitation (1000 rpm) to develop a secondary water-oil-water emulsion. After stabilization, the emulsion system is heated to a set temperature of 158° F. (70° C.), and at 122° F. (50° C.), 1,4-butanediol is added to initiate the polymerization reaction between the hydroxyl functional group from the aqueous phase and the isocyanate functional groups from the oil phase at the oil/water interface. As the TDI-prepolymer is much more reactive than HDI, 1,4-butanediol preferably reacts with TDI-prepolymer to form the shell structure, while the less reactive HDI forms the first core 110 of first microcapsules with second microcapsules.

Example 2: MIM Application in Mortar Test

In Example 2, the mortar specimens were prepared such that they comprised cement, water, and 10% by weight microcapsules. The paste specimens were prepared with a water-to-cement ratio of 0.4 where 10% by weight of the cement mass was replaced by MIM material which are then mixed well in a cement mortar agitator. At the end of mixing, the mortars were poured into a mold. After 24 h, the mortars are demolded and removed to a standard curing room kept at 68±4° F. (20±2° C.), 95% relative humidity (RH). Next, the mortar specimens were cracked via a splitting test, as described in ASTM C496/C496M-17, using an automated breaking and compression resistance tester. The initial crack width was measured, and after 10 h of self-healing, the cracks were fully filled with the reaction products of MIM and water.

In a second test, cracks were introduced in the cement cubes by means of a three-point bending test, as described in ASTM C78/C78M-21. It was observed that the isocyanates and polyols were released in the crack almost immediately after breakage of the microcapsules. Upon their release, the foaming reaction was initiated between the comprised liquid isocyanate and polyols, in the presence of water. As a result, this foaming reaction filled and healed along the whole crack length.

Although the preceding description has been described with reference to particular means, materials and embodiments, it is not intended to be limited to the particulars disclosed; rather, it extends to all functionally equivalent structures, methods and uses, such as those within the scope of the appended claims.

The presently disclosed systems, apparatuses, methods, processes and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

Ranges may be expressed as from about one particular value to about another particular value, inclusive. When such a range is expressed, it is to be understood that another embodiment is from the one particular value to the other particular value, along with all particular values and combinations thereof within the range. (In While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function

What is claimed:

1. A microcapsule encapsulated microcapsule (MIM) material for self-repairing cement comprising:
   a plurality of first microcapsules wherein each of the first microcapsule comprises a first core and a first shell;
   a plurality of second microcapsules that each comprise a second core and a second shell;
   wherein the plurality of second microcapsules are dispersed within a continuous phase comprised within the first core of each of the first microcapsules,
   wherein each of the first and second shell comprise a polyurethane cross-linked material,
   wherein the continuous phase of the first core comprises a dissolved isocyanate compound in a hydrophobic media.

2. The MIM material of claim 1, wherein the plurality of second microcapsules comprise water, a polyol, and a surfactant.

3. The MIM material of claim 1, wherein each of the first microcapsules have a diameter ranging from 10 μm to 500 μm.

4. The MIM material of claim 3, wherein the MIM material comprises first microcapsules of more than one diameter such that a particle diameter size distribution of the first microcapsules of the MIM materials is one or more selected from group consisting of from 10 to 150 μm, from 150 to 300 μm, from 300 to 500 μm, or a combination thereof.

5. The MIM material of claim 1, wherein the continuous phase of the first core comprises the dissolved isocyanate compound selected from the group consisting of diisocyanate, methylene diphenyl diisocyanate (MDI), hexamethylene diisocyanate (HDI), toluene diisocyanate (TDI), hydrogenate MDI, hexahydrotoluylene diisocyanate (H6TDI), trimethyl hexamethylene diisocyanate, tetramethyl xylylene isocyanate, tetramethyl xylylene diisocyanate, xylylene diisocyanate, isocyanate dimers, isocyanate trimers, polyisocyanates, polydiisocyanates, or combinations thereof.

6. The MIM material of claim 1, where the continuous phase of the first core comprises the dissolved isocyanate compound in an amount ranging from 40 to 70 wt. %, relative to the weight of the entire MIM material.

7. The MIM material of claim 2, wherein the polyol is one or more of a diol, a triol, and a polyol having four reactive hydroxyl groups.

8. The MIM material of claim 2, wherein the first core of the MIM material comprises a liquid polyisocyanate or a dissolved polyisocyanate.

9. The MIM material of claim 8, wherein equivalents of the liquid polyisocyanate or dissolved polyisocyanates and polyols may be contained within their respective first and second cores in a ratio, relative to each other, ranging from 0.9:1 to 1:1.1.

10. The MIM material of claim 7, wherein the diol is selected from the group consisting of 1,4-butanediol, ethylene glycol, diethylene glycol, triethylene glycol, tetraethylene glycol, propylene glycol, tripropylene glycol, 1,3-propanediol, 1,3-butanediol, neopentyl glycol, 1,6-hexanediol, and 1,4-cyclohexanedimethanol.

11. The MIM material of claim 2, wherein a surfactant is contained within both the first and second cores.

12. A method for forming a microcapsule encapsulated microcapsule (MIM) material for self-repairing cement, the method comprising:
    forming a water-in-oil emulsion containing an aqueous phase dispersed within a hydrophobic media continuous phase, wherein the aqueous dispersed phase comprises a mixture of polyol compounds, and wherein the continuous phase is comprised of a solvent;
    adding a mixture of a prepolymer and a dissolved isocyanate or liquid isocyanate compound to the water-in-oil emulsion;
    polymerizing the prepolymer in a first stage polymerization reaction with the polyol via interfacial polymerization to form a polymeric microcapsule shell, encapsulating the liquid polyol compound in the formed polymeric microcapsule and thereby producing a plurality of second microcapsules;
    forming a second water-in-oil-in-water emulsion, wherein the continuous phased is comprised of an aqueous solution, and wherein the dispersed phase is comprised of the water-in-oil emulsion comprising the produced plurality of second microcapsules;
    adding a second quantity of the prepolymer and the liquid isocyanate compound to an aqueous solution containing a surfactant; and
    adding a cross-linker to polymerize the prepolymer in a second stage polymerization reaction with the cross-linker via interfacial polymerization to form a larger polymeric microcapsule shell, encapsulating the liquid isocyanate compound and the plurality of second microcapsules in the formed polymeric microcapsule and thereby producing a plurality of first microcapsules.

13. The method of claim 12, wherein a surfactant is added during the formation of each of the first water-in-oil emulsion and second water-in-oil-in-water emulsion and is contained within both the first and second microcapsules.

14. The method of claim 12, wherein each of the first and second stage polymerization reactions are conducted at a temperature in a range from 125° F. to 225° F.

15. The method of claim 12, wherein in the first stage emulsion polymerization reaction, the amount of the hydrophobic media continuous phase is present in an amount in a range from 60 wt % to 90 wt % of the water-in-oil emulsion.

16. The method of claim 12, wherein in the second stage emulsion polymerization reaction, the amount of the aqueous solution may be present in an amount in a range from 60 wt % to 90 wt % of the water-in-oil-in-water emulsion.

17. A self-healing cement slurry comprising:
    cement;
    sand;
    water; and
    microcapsule encapsulated microcapsules (MIM) material comprising:
        a plurality of first microcapsules comprising a first core and a first shell;
        a plurality of second microcapsules that each comprise a second core and a second shell;
        wherein the plurality of second microcapsules are dispersed in a continuous phase within the first core of the first microcapsule,
        wherein both the first and second shell are comprised of a polyurethane cross-linked material; and
        wherein the cement slurry comprises the MIM material in an amount ranging from 1 to 50% by weight, relative to the entire weight of the cement slurry,
        wherein the continuous phase of the first core comprises a dissolved isocyanate compound in a hydrophobic media.

18. The self-healing cement of claim 17, wherein the cement slurry comprises the MIM material in an amount in a range from 1 to 20% by weight, relative to the entire weight of the cement slurry.

19. The self-healing cement of claim 17, wherein the cement slurry further comprises a swellable micronized rubber additive.

20. The self-healing cement of claim 19, wherein the swellable micronized rubber additive is a water-swellable micronized rubber additive comprising one or more compounds selected from the group consisting of isobutylene maleic anhydride, acrylic acid-type polymers, polyethylene oxide polymers, bentonite, or mixtures thereof.

21. The self-healing cement of claim 19, wherein the swellable micronized rubber additive is an oil-swellable micronized rubber additive comprising one or more compounds selected from the group consisting of nitrile rubber, styrene butadiene, and fluoro-silicones.

22. The self-healing cement of claim 19, wherein the swellable micronized rubber additive is comprised in an amount from 1 to 40 wt. % relative to the entire weight of the cement slurry.

* * * * *